J. T. BAKER.
Improvement in Folding-Squares.
No. 128,096. Patented June 18, 1872.
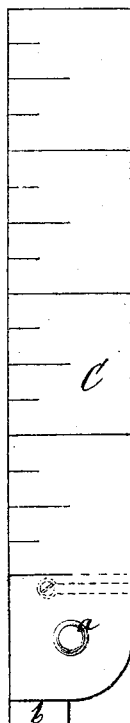
Fig. 1.
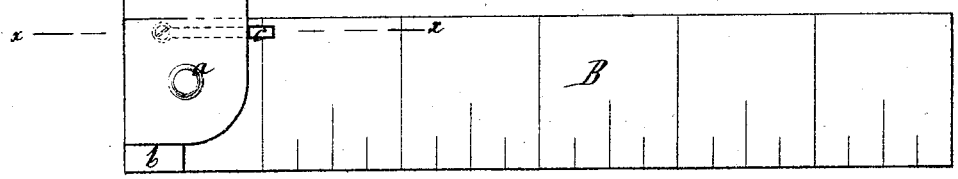
Fig. 2.
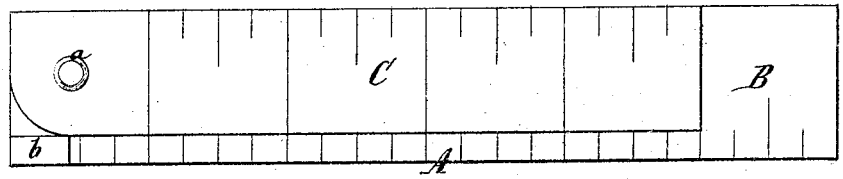
Fig. 3.
Witnesses:
Ernst Bilhuber.
C. Wahlers.
Inventor:
Jonathan T. Baker
pr
Van Santvoord & Hauff
Attys

UNITED STATES PATENT OFFICE.

JONATHAN T. BAKER, OF BROOKLYN, NEW YORK.

IMPROVEMENT IN FOLDING-SQUARES.

Specification forming part of Letters Patent No. 128,096, dated June 18, 1872.

*To all whom it may concern:*

Be it known that I, JONATHAN T. BAKER, of Brooklyn, in the county of Kings and State of New York, have invented a new and Improved Folding-Square; and I do hereby declare the following to be a full, clear, and exact description thereof, which will enable those skilled in the art to make and use the same, reference being had to the accompanying drawing forming a part of this specification, in which drawing—

Figure 1 represents a face view of my square when unfolded, ready for use. Fig. 2 is a similar view of the same when folded. Fig. 3 is a transverse section of the same in the plane $x\,x$, Fig. 1.

Similar letters indicate corresponding parts.

This invention consists in the arrangement of a fixed stop and a spring on the face of one shank of a square, to which the other shank is secured by a pivot in such a manner that when the pivoted shank is turned out until its end strikes the fixed stop it is retained in a position at right angles toward the supporting-shank, and the implement can be used like an ordinary square; and, if the pivoted shank is turned down so as to lie flat on the supporting-shank, the implement can be readily stowed away in a tool-box or chest.

In the drawing, the letter A designates a square, which is composed of a supporting-shank, B, and a pivoted shank, C, the two shanks being connected by a pivot, $a$, so that the pivoted shank can be turned out to the position shown in Fig. 1, or that it can be turned in to the position shown in Fig. 2. On the supporting-shank B is secured a fixed stop, $b$, in such a position that when the pivoted shank is turned out to the position shown in Fig. 1 it will be arrested, so that its edges are exactly at right angles with the edges of the supporting-shank, and in this position my implement can be used like an ordinary square. In order to prevent the two shanks from being thrown accidentally out of their proper position in relation to each other, a spring-catch $c$ is applied to the supporting-shank in such a position that it catches over the edge of the pivoted shank as soon as the same has been turned out to the required position. This spring-catch is intended to be fastened to the supporting-shank over a cavity, $d$, (see Fig. 3,) which allows of depressing the catch when it is desired to close up the square.

When my square is put away the pivoted shank C is turned into the position shown in Fig. 2, and in this condition the implement can readily be placed into a tool-box or chest, without requiring extra room or without protruding beyond the edge of the box. In this respect my square has a great advantage over a square of the ordinary construction, which, when placed in a tool-box, projects beyond its edge, to the great inconvenience of the person carrying the same.

What I claim as new, and desire to secure by Letters Patent, is—

The fixed stop $b$ and spring-catch $c$, in combination with the two shanks B C of a folding-square, said shanks being connected by a pivot, $a$, in the manner herein shown, and for the purpose set forth.

JONATHAN T. BAKER.

Witnesses:
   EDMUND T. BAKER,
   W. HAUFF.